(No Model.) 4 Sheets—Sheet 1.

F. FREY & A. M. WAYNE.
INCUBATOR.

No. 456,407. Patented July 21, 1891.

WITNESSES:
J. Henry Thiberath
C. Sedgwick

INVENTOR:
F. Frey
BY A. M. Wayne
Munn & Co.
ATTORNEYS

THE NORRIS PETERS CO., PHOTO-LITHO., WASHINGTON, D. C.

(No Model.) 4 Sheets—Sheet 2.

F. FREY & A. M. WAYNE.
INCUBATOR.

No. 456,407. Patented July 21, 1891.

WITNESSES:
J. Henry Theberath
C. Sedgwick

INVENTOR:
F. Frey
BY A. M. Wayne
Munn & Co.
ATTORNEYS (No Model.) 4 Sheets—Sheet 3.

F. FREY & A. M. WAYNE.
INCUBATOR.

No. 456,407. Patented July 21, 1891.

WITNESSES:
J. Henry Theberath
C. Sedgwick

INVENTOR:
F. Frey
A. M. Wayne
BY Munn & Co.
ATTORNEYS (No Model.) 4 Sheets—Sheet 4.

F. FREY & A. M. WAYNE.
INCUBATOR.

No. 456,407. Patented July 21, 1891.

WITNESSES:
J. Henry Thebenath
C. Sedgwick

INVENTOR:
F. Frey
A. M. Wayne
BY Munn & Co.
ATTORNEYS

UNITED STATES PATENT OFFICE.

FRANK FREY AND ABRAHAM M. WAYNE, OF QUINCY, ILLINOIS, ASSIGNORS, BY DIRECT AND MESNE ASSIGNMENTS, TO GEORGE W. MURPHY AND WILLIAM H. MURPHY, OF SAME PLACE.

INCUBATOR.

SPECIFICATION forming part of Letters Patent No. 456,407, dated July 21, 1891.

Application filed January 22, 1891. Serial No. 378,660. (No model.)

*To all whom it may concern:*

Be it known that we, FRANK FREY and ABRAHAM M. WAYNE, of Quincy, in the county of Adams and State of Illinois, have invented a new and useful Improvement in Incubators, of which the following is a full, clear, and exact description.

Our invention relates to an improvement in incubators, and has for its object to provide a means whereby the temperature will be automatically regulated and whereby a constant and perfect circulation of water in the heating-chamber will be obtained.

A further object of the invention is to render the body of the incubator impervious to moisture and cold, and to provide trays for the reception of the eggs so constructed that the heat will reach a maximum surface of the eggs, and whereby the position of the eggs may be changed expeditiously and conveniently and without danger of injuring them.

Another object of the invention is to provide pans for the interior of the hatching-chamber, which will absorb any surplus of moisture, and which also serve to direct the heat in currents to the trays.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1:
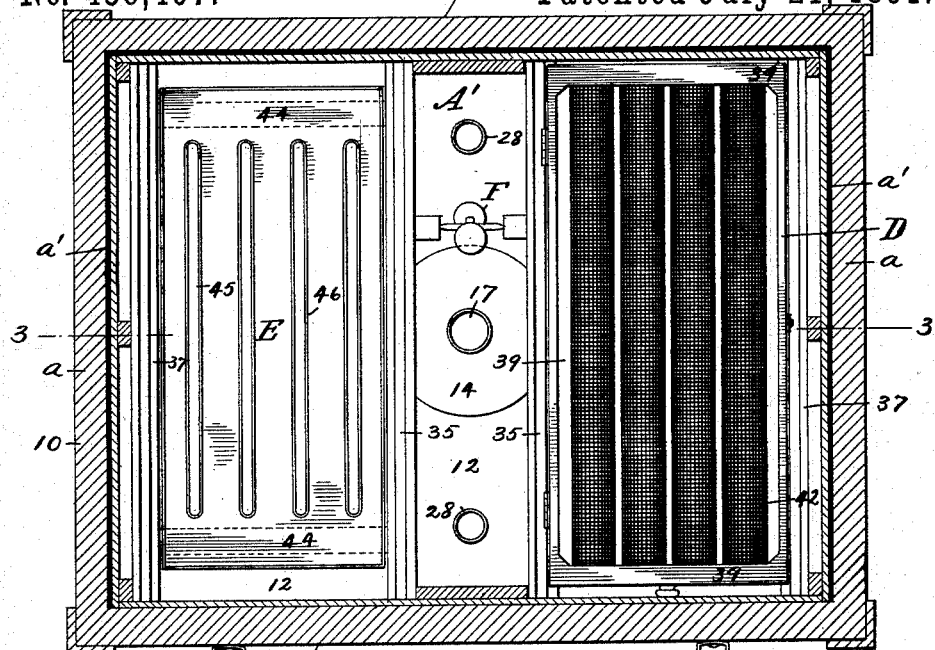
Figure 2:
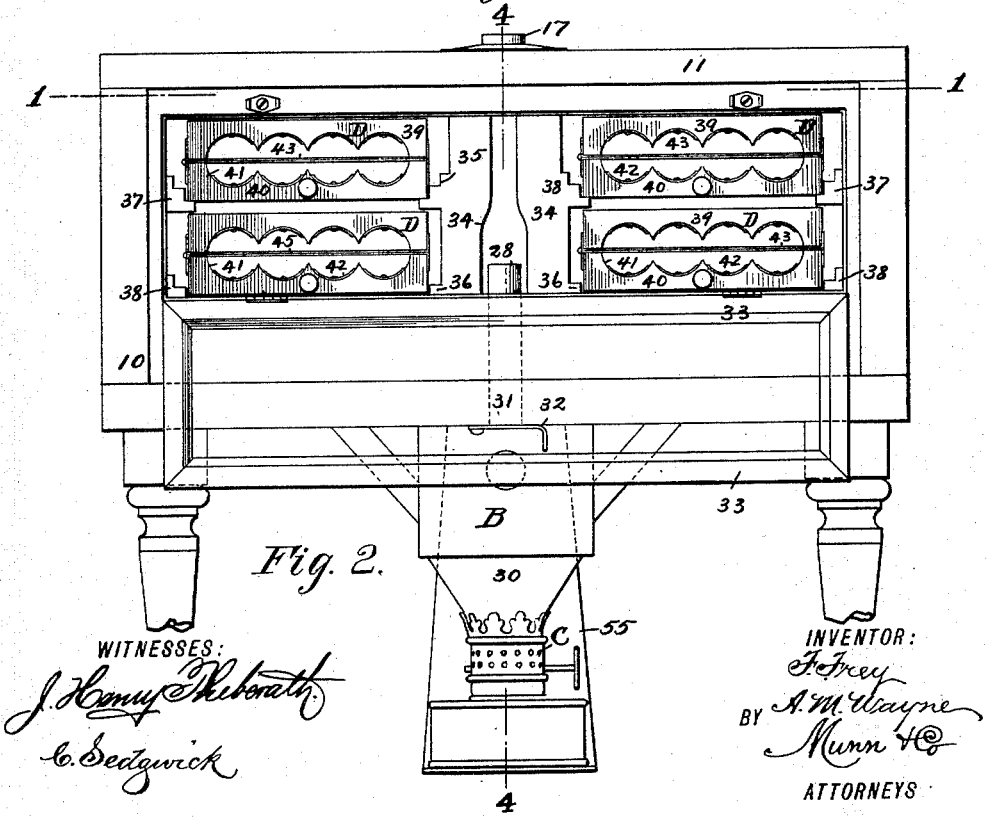
Figure 3:
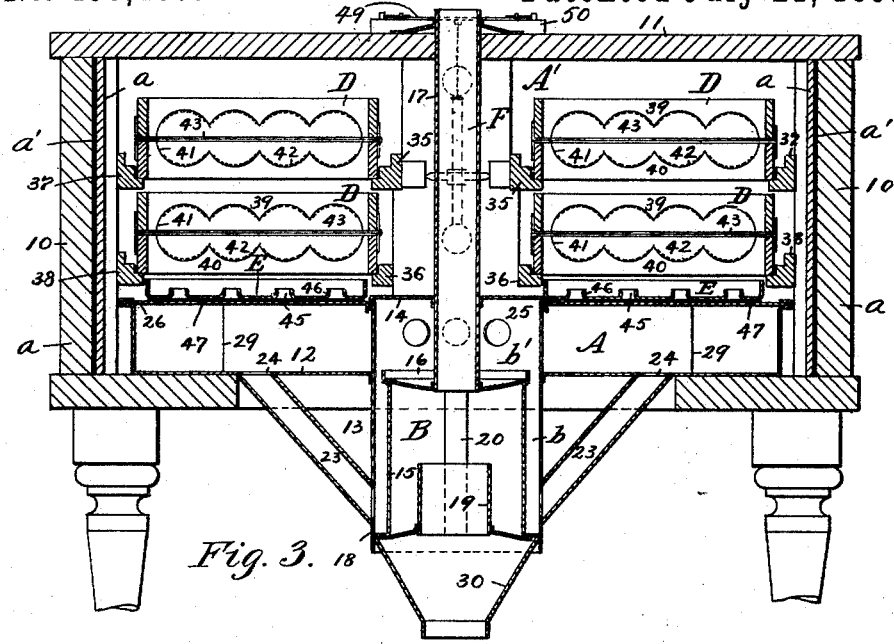
Figure 4:
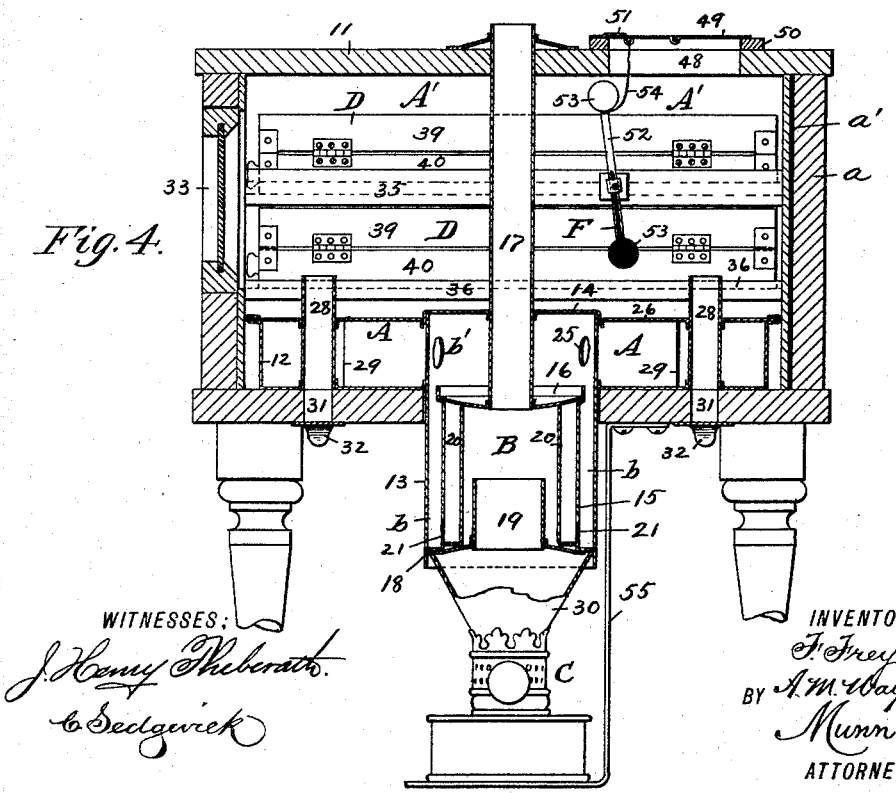
Figure 5:
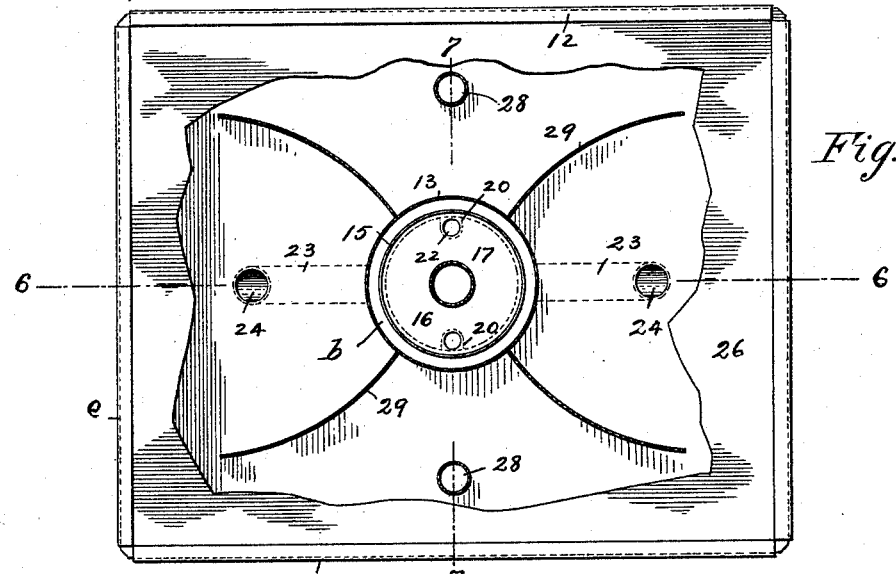
Figure 6:
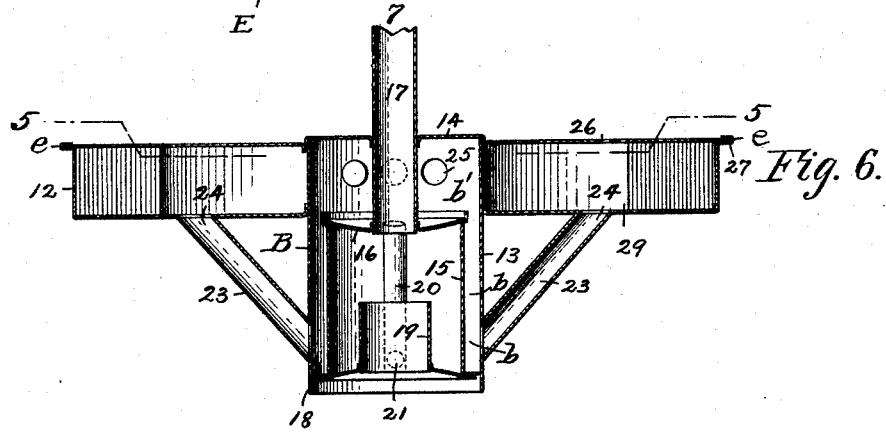
Figure 7:
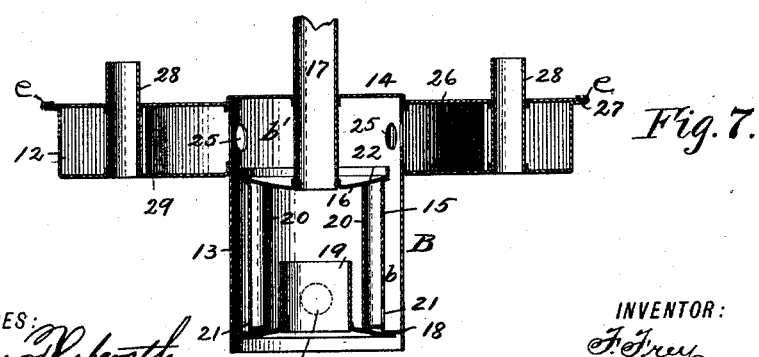
Figure 8:
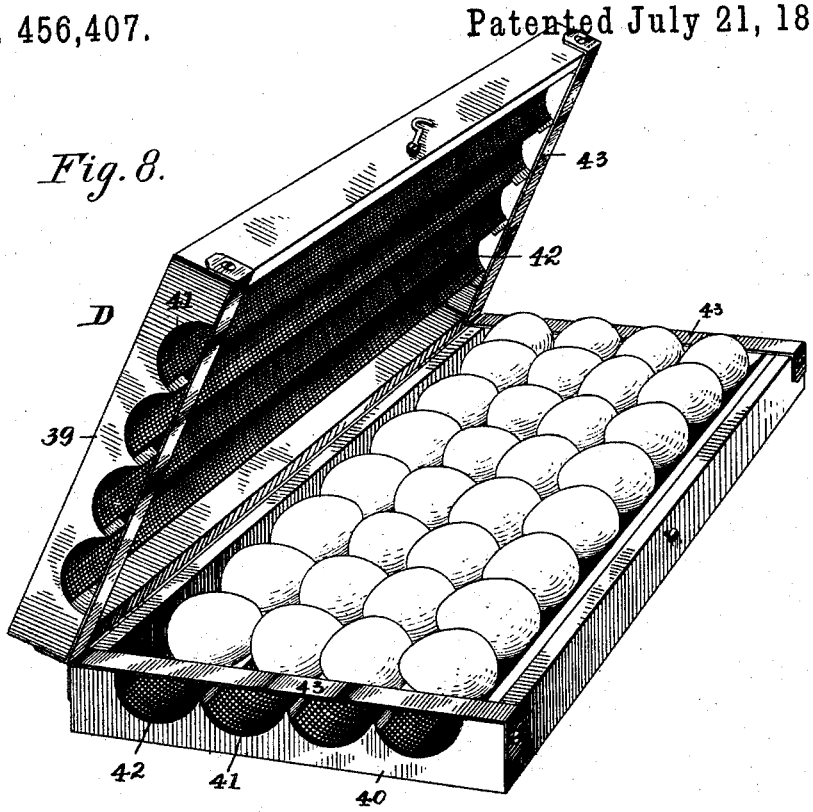
Figure 9:
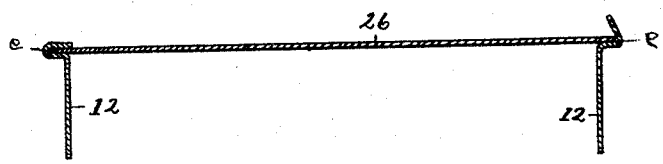

Figure 1 is a horizontal section through the incubator, the section being taken on the line 1 1 in Fig. 2. Fig. 2 is a side elevation of the incubator, the door thereof being open. Fig. 3 is a central longitudinal section taken practically on the line 3 3 of Fig. 1. Fig. 4 is a transverse central section taken on the line 4 4 of Fig. 2. Fig. 5 is a plan view, partly broken away, of the heating-compartment, the break being on the line 5 5 of Fig. 6. Fig. 6 is a longitudinal section through the apparatus, taken on the line 6 6 of Fig. 5; and Fig. 7 is a transverse section through the heating apparatus, the section being taken on the line 7 7 of Fig. 5. Fig. 8 is an enlarged perspective view of an egg-tray detached, and Fig. 9 is a detail sectional view illustrating the construction of the tank.

The body 10 of the incubator is box-like and usually rectangular, and the sides and ends of the body consist of two or more layers $a$, of wood, metal, or other suitable material, preferably wood, between which layers a layer $a'$ of paper or other non-conductor of cold or moisture is introduced.

The body is provided with a sealed cover 11 and is divided into two compartments—a lower heating-compartment A and an upper and larger hatching-compartment A'. The lower compartment consists of a tank 12, made preferably of sheet metal, which tank rests upon the bottom of the body and extends, preferably, from front to rear and from end to end thereof. The tank has integral with or attached to its inner face, preferably at its center, what we denominate a "boiler" B, which boiler extends downward through a suitable opening in the bottom of the body and below the same. The boiler consists, mainly, of a circular shell or jacket 13, which extends through the tank flush with its top, being covered at its upper end by a cap 14, as is best shown in Figs. 6 and 7, and an inner concentric shell 15 of less diameter and less height, whereby an annular space $b$ is made to intervene, the two shells having uninterrupted communication with a chamber $b'$ above the top of the inner shell. This chamber $b'$ is formed by securing a cover 16 upon the top of the inner shell, and the said cover is preferably given a dished or concaved upper face, being provided at its center with an aperture, into which aperture the lower end of a tube 17 is secured. The tube 17 acts as a chimney and extends upward through the hatching-chamber and through and beyond the top of the body 10. A partition 18 closes the space between the two shells at the bottom of the inner one, the outer shell or jacket being made to extend below the inner shell. The lower end of the inner shell is closed by a cap 19, resembling, essentially, an inverted funnel, which cap is attached in any approved manner at its outer lower edge to the partition 18, and the cap may, if desired, be made removable.

Upon diametrically-opposite sides of the inner surface of the boiler-shell upright tubes 20 are secured, which tubes we denominate "return-tubes." The lower ends of the return-tubes are closed; but at this point communication is established with the space $b$ and the interior of the return-tubes through the medium of openings 21, produced in the inner shell, as shown in Fig. 7, and the upper ends of the tubes, which are uncovered, are held to align with openings 22, formed in the top cover of the inner shell, as is shown in said Fig. 7.

Between the return-tubes 20 the lower ends of two tubes 23, arranged diametrically opposite, are connected with the said space $b$, the communication being through the outer shell or jacket, preferably a slight distance above the bottom of the space, as illustrated in Fig. 6, and the upper ends of the tubes are connected with the interior of the tank 12 through the medium of apertures 24, produced in its bottom at opposite sides of its center. The outer shell of the boiler within the tank has formed therein a series of openings 25, whereby communication is established between the tank and the annular space and chamber $b$ and $b'$.

The tank is provided with a cover 26, which fits closely around the boiler-cover 14 and is secured at its edges to the margin of the body of the tank. The manner in which the attachment of the cover-plate 26 is made to the body of the tank is best illustrated in Figs. 6 and 7, and consists in creating a flange 27, integral with the outer upper edge of the tank-body, which flange is bent over upon itself to form a horizontal channel, and the edges of the cover-plate 26 are inserted in the channel and soldered to place. By this means a tight joint is effected with considerable economy of solder. The tank is filled with water through the medium of a capped aperture produced at any desired point in the top thereof.

Between the points at which the tubes 23 enter the tank two oppositely-arranged air tubes or pipes 28 are carried upward through the tank from top to bottom, the said tubes being preferably flush with the bottom and of sufficient length to extend some distance beyond the top. The tubes are arranged at each side of the chimney 17, as shown in Figs. 5 and 7.

Within the tank semicircular baffle-plates 29 are located, extending from the bottom to the top, the said baffle-plates being made to radiate from the boiler B. One baffle-plate is curved in the direction of each corner of the tank and quite a space is made to intervene the outer ends of the baffle-plates and the sides and ends of the tank, as is best shown in Fig. 5. The baffle-plates are intended to direct the boiling water to the corners of the tank in order that all portions thereof may be equally heated. The heat is supplied through the medium of a lamp C or the equivalent thereof, the chimney 30 of which lamp is made to flare upward and outward and is of a proper diameter at the top to just enter the outer shell or jacket of the boiler, as illustrated in Figs. 3 and 4.

It will be observed in the operation of the boiler that as the water becomes heated by the flame of the lamp the heat passes upward through the inner shell of the boiler in engagement with the return-tubes 20 and off through the chimney 17. A constant circulation of water is obtained, as the portion of the water forced up through the side tubes 23 is directed to the corners of the tank by the baffle-plates 29 and another portion is made to enter the chamber $b'$ of the boiler through the apertures 25 therein, from whence it passes downward into the lower or annular chamber $b$, and from said chamber the water is directed to the tubes 20, where, being almost in direct communication with the heat, it is forced upward from the said tubes into the tank again through the branch pipes 23. The air-pipes 28 of the tank register with openings 31, produced in the bottom of the body of the incubator, as shown in Fig. 4, and the said openings 31 are capable of being closed by hinged covers 32, fitted upon the bottom of the box.

The hatching-chamber at the front of the incubator is provided with a door 33, which when opened exposes practically the entire width and height of the chamber, as shown in Fig. 2, the said door being preferably provided with a glass pane, whereby when the door is closed the contents of the hatching-chamber are rendered visible. At the open side of the hatching-chamber a post 34 is located at each side of the center, as is also best shown in Fig. 2, and to the outer edges of said posts slideways 35 and 36 are secured, which slideways are likewise attached to the rear side of the body in any suitable or approved manner, as illustrated in Fig. 1. The slideways are located one set at or near the center of the post and the other set at or near the bottom thereof, and corresponding and horizontally-aligning slideways 37 and 38 are secured to the inner face of the end surfaces of the body, as is likewise shown in Fig. 1. The lower slideways 36 and 38 are located some little distance above the top of the heating-tank 12, as is illustrated in Fig. 3.

The slideways are adapted to accommodate trays D, which trays are to contain the eggs to be hatched. The trays each consist of two rectangular skeleton frames 39 and 40, which frames are connected by a hinge at one side and are held close, one in engagement with the other, by means of a hook and eye or equivalent latch located at the opposite side. The inner end surfaces of the frame are provided with a series of concaved or semicircular recesses 41, the recesses of one frame being the same distance apart as the recesses in the other frame, whereby when the frames are closed a series of circular openings appear at each end. Strips 42, of perforated metal or of woven wire, are secured to the frames, the ends of the strips being nailed, screwed, or attached in any suitable or approved manner to the walls of the concaved recesses 41, and the strips 42 throughout their length are semicircular in cross-section.

In order to prevent the eggs when placed in the tray from slipping out, metal straps 43 are secured to the inner faces of the end strips of each frame. Thus a barrier is produced at each end of the tray, as is best illustrated in Figs. 2 and 3.

The various perforated or reticulated strips are so located that when the frames are closed the strips in the upper frame will be immediately over those in the lower frame. It is evident when the eggs are laid upon the strips of the lower frame of the tray that as soon as the upper frame is closed down upon the lower one the eggs will be firmly and yet gently held between the opposed strips. In fact, the eggs are held so securely in place that the trays may be taken out when occasion may demand and turned over without danger of breaking the eggs. The trays are adapted to slide upon the ways heretofore described, and each tray at its outer end is preferably provided with a knob or handle of any suitable description, whereby when the door 33 is opened any one of the trays or all of them may be withdrawn, its position may be reversed, and the tray may then be conveniently restored to its place.

Beneath each tier of trays a pan E is placed upon the top of the tank 12, as is best illustrated in Fig. 3, which pan is adapted to absorb any surplus moisture, and, as shown in Figs. 1 and 3, the pan consists of a metal plate 44, having marginal upturned flanges and having formed therein a series of longitudinal slots 45, the said slots being surrounded by upturned flanges 46. The slots are so located in the plate that when the pan is placed in position one of the said slots will be beneath each of the perforated or reticulated supporting-strips of the tray.

Upon the bottom of the metal plate a backing 47 of asbestus is secured in any suitable or approved manner. The asbestus serves to prevent the water in the tank from becoming too warm, and the slots, being directly under the series of egg-supporting strips, serve to direct the currents of heat directly to said strips, and any surplus of moisture will be caught and retained by the upper face of the pan.

In the cover 11 of the incubator, near one side or end, an opening 48 is formed, which opening is adapted to be normally closed by a valve-plate 49, pivoted at one side of its center, the said valve-plate being adapted to engage with the upper surface of a combing 50 at one end and the under surface of a plate 51, projecting from one side of the combing over the opening at its opposite end, as is best shown in Fig. 4. Thus one end of the valve-plate is capable of being drawn downward into the opening 48, and when this is accomplished the other end, passing upward, permits the hot air to pass out of the hatching-chamber.

The movement of the valve-plate is automatically controlled through the medium of a balance-thermometer F, the said thermometer being pivoted between its ends in any suitable manner at one side of the chimney 17. The thermometer usually consists of a tube 52, having a bulb 53 at each end, the said tube and one of the bulbs being adapted to contain mercury. The thermometer is so balanced that while the mercury, for instance, remains below the mark indicating 100° the tube 52 will maintain an essentially perpendicular position, and the valve-plate 49 will remain closed, as shown in Fig. 4. When, however, the mercury rises to the mark "100" upon the tube, the upper end of the tube will overbalance the lower end, and as the upper end descends it draws downward one end of the valve-plate 49, with which it is connected by means of a chain 54, cord, or its equivalent, and as the temperature continues to rise the upper end of the thermometer will continue to fall, and the supply of cold air to the hatching-chamber will be increased. It is evident that when the temperature is normal the thermometer will assume its normal position and the valve-plate will automatically close.

The lamp C is usually placed upon a bracket 55, projecting downward from the bottom of the body, as is best shown in Figs. 2 and 4.

In the construction of the tank 12 the sides are bent horizontally outward and over upon themselves, forming grooves or channels $e$, as shown in Figs. 6, 7, and 9, and the edges of the cover are placed in the channels, and the upper member of the latter is hammered down upon the cover. Solder may also be employed to cement said member to the cover, as has heretofore been mentioned.

Having thus described our invention, we claim as new and desire to secure by Letters Patent—

1. In an incubator, the combination, with the body thereof provided with a lower heating-compartment and an upper hatching-compartment, of a boiler located in the heating-compartment and projecting downward below the same, an offtake-flue connected with the boiler and extending upward through and beyond the hatching-compartment, vent-tubes passed from the bottom of the incubator through the heating-compartment into the hatching-compartment, and covers arranged at the bottom of the tubes, as and for the purpose specified.

2. In an incubator, a heating apparatus consisting of a tank closed upon all sides, a boiler connected with the tank, comprising an outer circular jacket extending through the tank to the top thereof and below said tank, the said jacket being provided with an upper cap, an inner concentric shell of less length than the jacket, a partition closing the space between the lower end of the jacket and inner shell, tubes projected upward from the opposite sides of the jacket into the tank, a cap covering the upper portion of the inner shell, and an offtake-flue passed through the said cap, as and for the purpose specified.

3. In an incubator, a heating apparatus consisting of a closed water-tank, a boiler connected with the tank, comprising a circular jacket capped at its upper end, an inner concentric shell of less length than the jacket and provided with a cap at its upper end, an annular projection closing the space between the lower ends of the jacket and shell, return-tubes secured to the inner face of the inner shell, closed at their bottoms, and extending up through the cap of said shell, the said tubes having connection with the interior of the jacket, an offtake-flue extending downward in the cap of the inner jacket, and inclined pipes connected with the interior of the jacket at opposite sides and also connected with the interior of the tank, as and for the purpose specified.

4. In an incubator, a heating apparatus consisting of a closed tank provided with a series of interior baffle-plates, air-vent tubes extending through at opposite sides of the center, a boiler connected with the tank, comprising a circular jacket capped at its upper end, an inner concentric shell of less length than the jacket, provided with a cap at its upper end, an annular projection closing the space between the lower ends of the jacket and shell, return-tubes secured to the inner face of the inner shell, closed at their bottoms, and extending out through the cap of said shell, the said return-tubes having connection with the interior of the jacket, an offtake-flue extending downward in the cap of the inner jacket, and inclined pipes connected with the interior of the jacket at opposite sides and also connected with the interior of the tank, as and for the purpose specified.

5. In an incubator, the combination, with a tank and a boiler projecting through the center of the tank and communicating therewith, of baffle-plates secured to the boiler and projecting in the direction of the corners of the tank, substantially as and for the purpose set forth.

6. In an incubator, a heating apparatus consisting of a tank provided with baffle-plates radiating from its center, a boiler located in the central portion of the tank, projecting downward below the same, the said boiler comprising an upper jacket having apertures produced at its upper end and a cap covering said end, an inner concentric shell of less diameter and length than the jacket, the said shell being provided with a cap at its top, an offtake-flue connected with the top, return-flues secured to the inner face of the shell, closed at their bottoms, and communicating at their top and bottom with the interior of the jacket, inclined pipes arranged at opposite sides of the jacket, having communication with its interior and with the interior of the tank, a partition connecting the lower ends of the jacket and shell, and a conducting-flue located at the bottom of the shell and jacket, the said conducting-flue being substantially in the shape of an inverted funnel, as and for the purpose specified.

7. In an incubator, an egg-tray comprising two skeleton frames hinged together and each having a series of semicircular recesses extending from end to end of the frames and having open ends, substantially as described.

8. In an incubator, an egg-tray consisting of two skeleton frames hinged together and each having semicircular recesses formed in the inner end surface of the frame and perforated strips secured in the said recesses and extending from end to end of the frame, substantially as described.

9. In an incubator, an egg-tray consisting of two skeleton frames hinged together and each having semicircular recesses formed in the inner end surface of the frame, semicircular perforated strips secured in the recesses and extending from end to end of the frames, and strips secured to the inner faces of the ends of the frames and forming barriers for the ends of the same, substantially as herein shown and described.

FRANK FREY.
ABRAHAM M. WAYNE.

Witnesses:
WM. H. MURPHY,
W. A. BRADNEY.